US012256423B2

(12) United States Patent
Lin

(10) Patent No.: US 12,256,423 B2
(45) Date of Patent: Mar. 18, 2025

(54) ELECTRONIC DEVICE AND METHOD FOR SCHEDULING RESTRICTION

(71) Applicant: MEDIATEK INC., Hsinchu (TW)

(72) Inventor: Hsuan-Li Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 410 days.

(21) Appl. No.: 17/764,396

(22) PCT Filed: Sep. 29, 2020

(86) PCT No.: PCT/CN2020/118802
§ 371 (c)(1),
(2) Date: Mar. 28, 2022

(87) PCT Pub. No.: WO2021/063351
PCT Pub. Date: Apr. 8, 2021

(65) Prior Publication Data
US 2022/0353872 A1 Nov. 3, 2022

Related U.S. Application Data

(60) Provisional application No. 62/910,585, filed on Oct. 4, 2019.

(51) Int. Cl.
H04W 4/00 (2018.01)
H04L 5/00 (2006.01)
H04W 72/542 (2023.01)

(52) U.S. Cl.
CPC ......... H04W 72/542 (2023.01); H04L 5/0048 (2013.01)

(58) Field of Classification Search
CPC ............. H04W 72/542; H04W 72/541; H04L 5/0048; H04B 17/327

(Continued)

(56) References Cited

U.S. PATENT DOCUMENTS 11,184,787 B2  11/2021  Muruganathan et al.
2011/0312319 A1*  12/2011  Lindoff ............ H04W 36/0072
                                                 455/450

(Continued)

FOREIGN PATENT DOCUMENTS

CN  102104939 A  6/2011
CN  102742347 A  10/2012

(Continued)

OTHER PUBLICATIONS

Chinese language office action dated Jun. 16, 2023, issued in application No. CN 202080067924.7.

(Continued)

Primary Examiner — Chuong T Ho
(74) Attorney, Agent, or Firm — McClure, Qualey & Rodack, LLP

(57) ABSTRACT

Aspects of the disclosure provide an electronic device including a transceiver and processing circuitry and a method for scheduling restriction. The transceiver can receive from a network configuration information to configure a measurement resource for a signal quality measurement. The signal quality measurement can determine a signal quality of a reference signal from the network to the electronic device. The processing circuitry can determine whether to apply the scheduling restriction based on the configuration information. In response to applying the scheduling restriction, the processing circuitry can determine when to apply the scheduling restriction based at least on a resource type of the measurement resource, the resource type being one of periodic, semi-persistent, and aperiodic. In an example, the signal quality of the reference signal includes a layer 1 (L1) reference signal received power (L1-RSRP) for the reference signal and the signal quality measurement includes an L1-RSRP measurement.

20 Claims, 11 Drawing Sheets

(58) Field of Classification Search
USPC .................................. 370/329, 330, 328
See application file for complete search history.

(56) References Cited

U.S. PATENT DOCUMENTS

| | | | |
|---|---|---|---|
| 2015/0256280 | A1 | 9/2015 | Park et al. |
| 2018/0205577 | A1* | 7/2018 | Shin ...................... H04L 5/0048 |
| 2019/0174466 | A1* | 6/2019 | Zhang ................... H04L 5/0057 |
| 2020/0107337 | A1* | 4/2020 | Lin ........................ H04L 1/0026 |
| 2020/0107383 | A1* | 4/2020 | Novlan ................. H04W 76/15 |
| 2020/0112869 | A1* | 4/2020 | Kim ...................... H04B 7/0632 |
| 2020/0196179 | A1* | 6/2020 | Kim ...................... H04W 48/12 |
| 2020/0366351 | A1* | 11/2020 | Karjalainen .......... H04W 76/27 |
| 2021/0092697 | A1* | 3/2021 | Harada ................. H04L 5/0044 |
| 2021/0152411 | A1* | 5/2021 | Kuang .................. H04L 5/0039 |
| 2021/0167920 | A1* | 6/2021 | Cha ........................ H04B 7/088 |
| 2021/0195452 | A1* | 6/2021 | Harada ................. H04L 5/0053 |
| 2021/0314045 | A1* | 10/2021 | Cha ....................... H04W 16/28 |
| 2021/0376894 | A1* | 12/2021 | Cha ...................... H04B 7/0695 |
| 2022/0110181 | A1* | 4/2022 | Miao ..................... H04L 1/1822 |
| 2022/0295303 | A1* | 9/2022 | Takada .................. H04B 7/088 |
| 2022/0353872 | A1* | 11/2022 | Lin ..................... H04W 72/541 |

FOREIGN PATENT DOCUMENTS

| | | |
|---|---|---|
| CN | 104935396 A | 9/2015 |
| CN | 110249571 A | 9/2019 |
| WO | 2011/099906 A1 | 8/2011 |
| WO | 2014/204682 A1 | 12/2014 |
| WO | 2019/029597 A1 | 2/2019 |

OTHER PUBLICATIONS

International Search Report and Written Opinion dated Dec. 30, 2020, issued in application No. PCT/CN2020/118802.
NTT Docomo, Inc.; "Remaining issues on L1-RSRP Computation for reporting;" 3GPP TSG RAN WG4 Meeting #88bis, R4-1812711; Oct. 2018; pp. 1-4.
Intel Corporation; "CR to 38.214 for CSI-RS (TRS, CSI, IM) + PDSCH multiplexing;" 3GPP TSG RAN WG1 Meeting #95, R1-1812469; Nov. 2018; pp. 1-2.

\* cited by examiner

ELECTRONIC DEVICE AND METHOD FOR SCHEDULING RESTRICTION

INCORPORATION BY REFERENCE

This present application claims the benefit of priority to U.S. Provisional Application No. 62/910,585, "L1-RSRP Scheduling Restriction" filed on Oct. 4, 2019, which is incorporated by reference herein in its entirety.

TECHNICAL FIELD

The present application relates generally to wireless communication technology including signal quality measurement and reporting.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

High frequency bands (e.g., above 6 GHz) are used in 5th Generation (5G) wireless communication systems to increase system capacity. Beamforming schemes can be employed to focus transmitted and/or received signal in a desired direction to compensate for path loss of high frequency signals. For example, a base station may employ multiple beams to cover a serving area in a 5G system. Improvements and enhancements are required for measurement and measurement report for the 5G system.

SUMMARY

Aspects of the disclosure provide an electronic device including a transceiver and processing circuitry and a method for scheduling restriction. The transceiver is configured to receive from a network configuration information to configure a measurement resource for a signal quality measurement. The signal quality measurement can determine a signal quality of a reference signal from the network to the electronic device. The processing circuitry is configured to determine whether to apply the scheduling restriction based on the configuration information. In response to applying the scheduling restriction, the processing circuitry is configured to determine when to apply the scheduling restriction based at least on a resource type of the measurement resource, the resource type being one of periodic, semi-persistent, and aperiodic.

In an example, the signal quality of the reference signal includes a layer 1 (L1) reference signal received power (L1-RSRP) for the reference signal and the signal quality measurement includes an L1-RSRP measurement.

In an embodiment, the configuration information further includes a reporting configuration for a reporting of the signal quality. The measurement resource that is configured based on the configuration information is a periodic channel-state information reference signal (CSI-RS) resource or at least one synchronization signal block (SSB) and the resource type is periodic. The processing circuitry is configured to apply the scheduling restriction when the reporting of the signal quality is configured for the signal quality measurement based on the reporting configuration. In an example, the measurement resource is the at least one SSB configured for the signal quality measurement where the at least one SSB corresponds to at least one SSB index. The processing circuitry is configured to allow the signal quality measurement on symbols corresponding to the at least one SSB index and disallow uplink (UL) transmission and/or downlink (DL) reception by the electronic device on the symbols corresponding to the at least one SSB index. In an example, the measurement resource is the periodic CSI-RS resource configured for the signal quality measurement. The processing circuitry is configured to allow the signal quality measurement on at least one symbol corresponding to the periodic CSI-RS resource and disallow UL transmission and/or DL reception by the electronic device on the at least one symbol corresponding to the periodic CSI-RS resource.

In an embodiment, the configuration information further indicates a reporting configuration for a reporting of the signal quality, the reporting being semi-persistent or aperiodic. The measurement resource that is configured based on the configuration information is a semi-persistent CSI-RS resource or an aperiodic CSI-RS. The processing circuitry is configured to apply the scheduling restriction when (i) the reporting for the signal quality is configured for the signal quality measurement based on the reporting configuration and (ii) at least one of the measurement resource and the reporting is triggered or activated by the network.

In an example, the at least one of the measurement resource and the reporting includes the measurement resource and the reporting. The reporting is semi-persistent, the measurement resource is the semi-persistent CSI-RS resource, and the configuration information further indicates whether a medium access control-control element (MAC-CE) is used to activate the scheduling restriction or downlink control information (DCI) is used to trigger the scheduling restriction. When the configuration information indicates that the MAC-CE is used, the transceiver is configured to receive the MAC-CE to activate the measurement resource and the reporting. When the configuration information indicates that the DCI is used, the transceiver is configured to receive the DCI to trigger the measurement resource and the reporting. The processing circuitry is configured to allow the signal quality measurement on at least one symbol corresponding to the semi-persistent CSI-RS resource and disallow UL transmission and/or DL reception by the electronic device on the at least one symbol corresponding to the semi-persistent CSI-RS resource.

In an example, the at least one of the measurement resource and the reporting includes the measurement resource. The reporting is aperiodic, the measurement resource is the semi-persistent CSI-RS resource, the configuration information further indicates whether a MAC-CE is used to activate the scheduling restriction or DCI is used to trigger the scheduling restriction. When the configuration information indicates that the MAC-CE is used, the transceiver is configured to receive the MAC-CE to activate the measurement resource. When the configuration information indicates that the DCI is used, the transceiver is configured to receive the DCI to trigger the measurement resource. The processing circuitry is configured to allow the signal quality measurement on at least one symbol corresponding to the semi-persistent CSI-RS resource and disallow UL transmission and/or DL reception by the electronic device on the at least one symbol corresponding to the semi-persistent CSI-RS resource.

In an example, the at least one of the measurement resource and the reporting includes the measurement resource and the reporting. The reporting is aperiodic, the measurement resource is the aperiodic CSI-RS resource, and the configuration information further indicates DCI is used to trigger the scheduling restriction. The transceiver is configured to receive the DCI to trigger the measurement resource and the reporting. The processing circuitry is configured to allow the signal quality measurement on at least one symbol corresponding to the aperiodic CSI-RS resource and disallow UL transmission and/or DL reception by the electronic device on the at least one symbol corresponding to the aperiodic CSI-RS resource.

In an embodiment, the processing circuitry is configured to determine that no scheduling restriction is applied to the measurement resource when the measurement resource satisfies a condition. The condition can include that (i) the measurement resource is a CSI-RS, (ii) the CSI-RS is quasi co-located with an active transmission configuration indicator (TCI) state for physical downlink shared channel (PDSCH)/physical downlink control channel (PDCCH), (iii) the CSI-RS is not in a CSI-RS resource set with a higher layer parameter 'repetition' being ON, and (iv) the CSI-RS is in a CSI-RS resource set with the higher layer parameter 'repetition' set to OFF. The processing circuitry is configured to determine that the scheduling restriction is applicable to the measurement resource when the measurement resource does not satisfy the condition.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
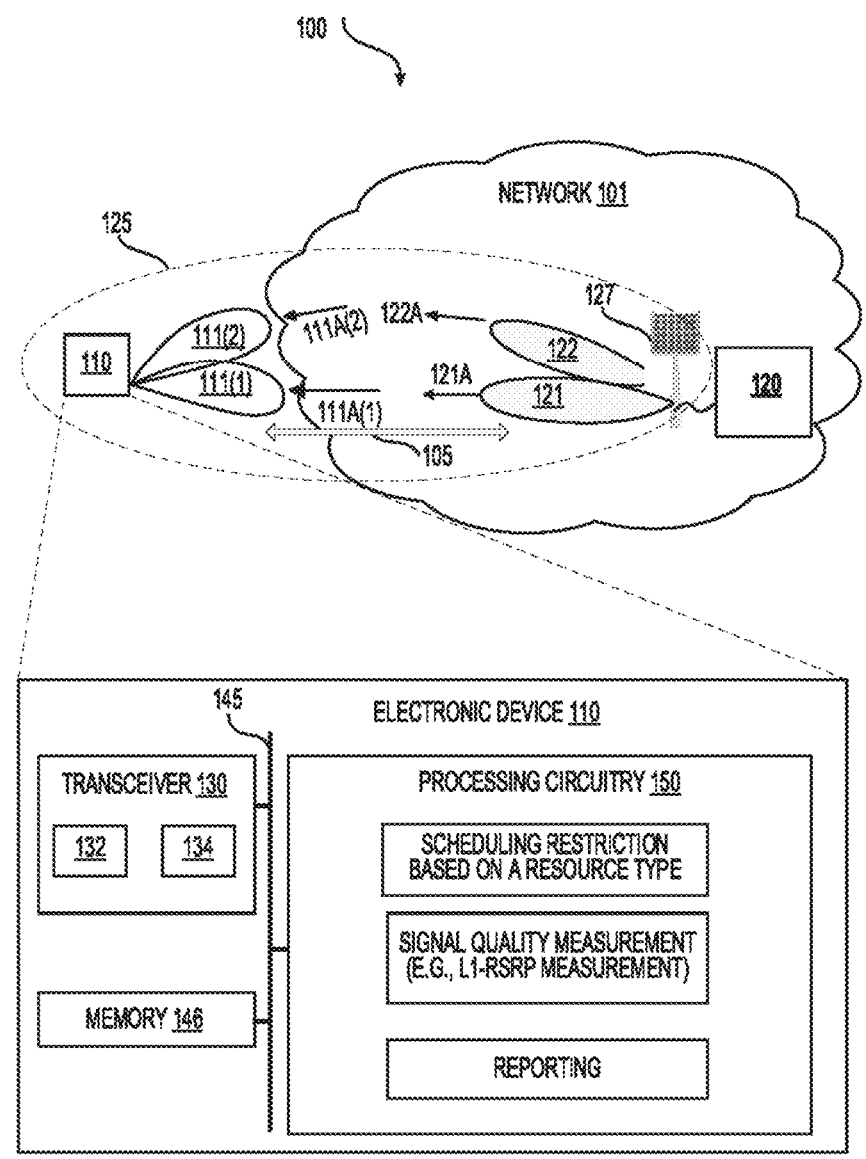
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a network 101 and an electronic device 110 that receives wireless communication service from the network 101. One or more cells (e.g., a cell 125) can be configured to serve the electronic device 110, for example, by a base station 120 in the network 101. In an example, the base station 120 can control a transmission reception point (TRP) 127 to cover the cell 125. In an example, the network 101 includes a fifth generation (5G) radio access network (RAN) (or Next Generation (NG) RAN) and a 5G core network (5GC) that uses 5G mobile network technology. The base station 120 can be a next generation Node B (gNB) specified in 5G new radio (NR) air interface standards developed by 3rd Generation Partnership Project (3GPP). A signal quality (e.g., layer-1 (L1) reference signal received power (RSRP) (L1-RSRP)) can be measured by the electronic device 110 and reported to the network 101 (e.g., the base station 120). Scheduling restriction can be implemented due to certain signal quality measurements (e.g., L1-RSRP measurement(s)). Thus, the electronic device 110 may not transmit or receive data on symbol(s) to be measured in the signal quality measurements (e.g., the L1-RSRP measurement(s)).

According to aspects of the disclosure, a transceiver 130 of the electronic device 110 can receive from the network 101 configuration information to configure a measurement resource (also referred to a resource) for the signal quality measurement. Processing circuitry 150 of the electronic device 110 can determine whether to apply the scheduling restriction based on the configuration information. In response to applying the scheduling restriction, the processing circuitry 150 can determine when to apply the scheduling restriction based at least on a measurement resource type (also referred to as a resource type) of the measurement resource. The resource type can be one of periodic, semi-persistent, and aperiodic corresponding to a periodic resource, a semi-persistent resource, and an aperiodic resource.

Referring to FIG. 1, in the cell 125, the electronic device 110 can communicate wirelessly with the base station 120 via a wireless link 105 associated with a beam 121 transmitted from the base station 120 and a beam 111(1) received by the electronic device 110. In general, a beam is allocated with radio resources including a set of time and/or frequency resources. A beam can be further associated with a direction indicating a dominant propagation direction of signal energy of the beam. A beam can refer to a signal or a channel transmitted from or received by the electronic device 110 or the base station 120. For example, in the cell 125, beams 121-122 transmitted from the base station 120 (e.g., the TRP 127) mainly propagate along directions 121A-122A, respectively and are referred to as transmission beams (Tx beams) from the base station 120. Beams 111(1)-(2) can be referred to as reception beams (Rx beams) of the electronic device 110. The Rx beams 111(1)-(2) are mainly received by the electronic device 110 along directions 111A(1)-(2), respectively.

In general, beam management, e.g., a set of procedures to acquire and maintain a set of Tx and Rx beams, can be implemented to form and maintain a suitable wireless link between the base station 120 and the electronic device 110 for uplink (UL) and downlink (DL) transmission/reception.

The network 101 includes various base stations, such as the base station 120, and core nodes that are interconnected using any suitable network technology, such as wired, wireless, a cellular communication technology, a local area network (LAN), a wireless LAN (WLAN), a fiber optical network, a wide area network (WAN), a peer-to-peer network, the Internet, and the like. In some embodiments, the network 101 provides wireless communication service to electronic devices, such as the electronic device 110, using any suitable wireless communication technology, such as second generation (2G), third generation (3G), and fourth generation (4G) mobile network technologies, 5G mobile network technology, global system for mobile communication (GSM), long-term evolution (LTE), NR technology, and the like. In some examples, the network 101 employs wireless communication technologies developed by 3GPP. In an example, the base stations in the network 101 form one or more access networks and the core nodes form one or more core networks. An access network can be a RAN, such as a 5G RAN or NG RAN. A core network can be an evolved packet core (EPC), a 5GC, and the like.

In various examples, the base station 120 can be referred to as a Node B, an evolved Node B, a gNB, and the like. The base station 120 includes hardware components and software components configured to enable wireless communications between the base station 120 and the electronic device 110. Further, the core nodes include hardware components and software components to form a backbone to manage and control the services provided by the network 101.

In some embodiments, high frequencies, also referred to as millimeter Wave (mmWave) frequencies are used as carrier frequencies in the communication system 100 to increase a network capacity. In an example, the high frequencies are higher than 6 giga-Hertz (GHz), such as between 24-84 GHz. In an example, carrier frequencies less than 6 GHz are referred to as low frequencies, such as between 600 MHz to less than 6 GHz. For example, a frequency range 1 (FR1) includes frequencies below 6 GHz and a frequency range 2 (FR2) includes frequencies in the range 24.25-52.6 GHz. Signals (or beams) having mmWave frequencies as carrier frequencies, referred to as high frequency (HF) signals, can experience large propagation loss and can be sensitive to blockage. Accordingly, for the HF signals, the base station 120 and the electronic device 110 can perform beamformed transmission and/or reception to compensate for the propagation loss as described above. In beamformed transmission, signal energy can be focused predominantly toward a specific direction, such as the directions 121A-122A associated with the Tx beams 121-122. As a result, an increased antenna transmission gain can be achieved in contrast to omnidirectional antenna transmission. Similarly, in beamformed reception, signal energy received predominantly from a specific direction can be combined to obtain a higher antenna reception gain in contrast to omnidirectional antenna reception, such as the directions 111A(1)-(2) associated with the Rx beams 111(1)-(2) of the electronic device 110, respectively.

The electronic device 110 can be any suitable electronic device that can implement signal quality measurements (e.g., L1-RSRP measurements) and scheduling restriction. The electronic device 110 can be configured to receive signals from and transmit signals to the network 101. The electronic device 110 can form multiple links with the network 101 via carrier aggregation (CA). In an example, the electronic device 110 is a terminal device (e.g., user equipment) for wireless communication, such as a cell phone, a smart phone, a tablet computer, a laptop, a smart device, a wearable device, and the like. Similarly, the electronic device 110 can employ one or more antenna arrays to generate directional Tx or Rx beams for transmitting or receiving signals FR1, FR2, and/or the like. The electronic device 110 and/or the base station 120 can also include suitable transceivers and antennas that transmit and receive omnidirectional wireless signals, for example, in FR1.

Referring to FIG. 1, the electronic device 110 can include the transceiver 130, the processing circuitry 150, and memory 146 that are coupled together, for example, using a bus architecture (e.g., a bus 145). The transceiver 130 is configured to receive and transmit wireless signals. In an example, the transceiver 130 includes a first transceiver 132 that transmits and receives low frequency signals (LF signals), such as omnidirectional wireless signals, and a second transceiver 134 that transmits and receives the HF signals (e.g., FR2) including Tx and Rx beams. In an example, the wireless link 105 is formed based on the Tx beam 121 and the Rx beam 111(1) for the electronic device 110 to receive DL signals from the base station 120. In the FIG. 1 example, the direction 111A(1) of the Rx beam 111(1) is matched to the direction 121A of the Tx beam 121 by tuning respective antennas of the electronic device 110 and/or the base station 120.

In an example, the wireless link 105 can be formed based on the Tx beam 121 and an omnidirectional reception beam (not shown) of the electronic device 110. In an example, the wireless link 105 can be formed based on the Rx beam 111(1) and an omnidirectional transmission beam (not shown) of the base station 120.

The wireless link 105 can also be used for the electronic device 110 to transmit UL signals to the base station 120 via a Tx beam of the electronic device 110 and a Rx beam of the base station 120. Further, radio resources for the UL signals, such as the Tx beam of the electronic device 110 can be different from the radio resources used for the DL signals. In an example, the electronic device 110 is configured with beam correspondence, and directions of the UL signals (the Tx beam of the electronic device 110 and the Rx beam of the base station 120) in the wireless link 105 are opposite to the directions 111A(1) and 121A, respectively.

In an example, the second transceiver 134 transmits or receives the HF signals (e.g., FR2), and the first transceiver 132 causes an antenna to transmit or receive the LF signals (e.g., FR1). The LF signals can include omnidirectional beams, directional beams, and/or the like. A directional beam in FR1 can be wider (e.g., having a larger angular spread) than a directional beam in FR2. For example, 4 directional beams in FR1 can cover an angular range while 64 directional beams in FR2 can cover the same angular range.

In some embodiments, the transceiver 130 is configured to receive signals or DL signals (e.g., Tx beams and/or omnidirectional beams) from the network 101. The DL signals can include physical downlink control channel (PDCCH) and physical downlink shared channel (PDSCH). The DL signals can include reference signals (RSs) that can be used to estimate beam and link qualities and facilitate beam failure recovery (BFR) in cell(s) that serve the electronic device 110. RSs can include a channel-state information reference signal (CSI-RS), a synchronization signal block (SSB), and the like. In some embodiments, an SSB that includes resources in time and frequency is formed with a primary synchronization signal (PSS), a secondary synchronization signal (SSS), and a Physical Broadcast Channel (PBCH).

The transceiver 130 is configured to receive the configuration information, for example, via radio resource control (RRC) configuration from the network 101. The configuration information can indicate a resource configuration for the measurement resource and a reporting configuration for a reporting of the signal quality. For example, the resource configuration indicates that the measurement resource is a SSB, a periodic CSI-RS resource, a semi-persistent CSI-RS resource, or an aperiodic CSI-RS resource. In an example, the SSB is a periodic resource. The reporting configuration (e.g., reportConfig) can indicate that the reporting is periodic, semi-persistent, and or aperiodic. The configuration information can further indicate whether a medium access control-control element (MAC-CE) is used to activate the scheduling restriction or downlink control information (DCI) is used to trigger the scheduling restriction.

The transceiver 130 is configured to transmit various signals or UL signals, such as the HF signals and the LF signals. The UL signals can include physical uplink control channel (PUCCH), physical uplink shared channel (PUSCH), sounding reference signal (SRS), and the like.

The processing circuitry 150 can be configured to measure one or more signal qualities of one or more signals, such as RS(s). The one or more signal qualities can include RSRP(s), reference signal received quality (RSRQ), and the like. The RSRP(s) can further include L1-RSRP(s), layer 3-RSRP(s) (L3-RSRP(s)), and/or the like. A L1-RSRP can be a beam-level measurement and thus can correspond to a beam or a beam pair. For example, a L1-RSRP corresponds to the beam pair 121 and 111(1). Alternatively, the L1-RSRP corresponds to the Rx beam 111(1). Multiple DL Rx directions can be used to receive RSs and the processing circuitry 150 can determine signal qualities (e.g., RSRPs, L1-RSRPs) of the RSs received from the corresponding DL Rx directions. The signal qualities (e.g., L1-RSRPs) can indicate powers of the RSs received from corresponding DL Rx directions. L1-RSRP measurements can be performed on CSI-RS resource(s) and/or SSB resource(s). The processing circuitry 150 can measure or monitor RS(s) (e.g., an SSB, a CSI-RS) for beam management, cell activation/deactivation, and/or the like.

In some scenarios, such as due to certain signal quality measurements, scheduling restriction is necessary to ensure proper operations of the communication system 100. Accordingly, the processing circuitry 150 is configured to implement scheduling restriction, for example, due to certain signal quality measurements (e.g., L1-RSRP measurements), and the electronic device 110 may not transmit or receive data on symbol(s) to be measured in the signal quality measurements (e.g., the L1-RSRP measurement(s)). In an example, the electronic device 110 is not expected to transmit PUCCH/PUSCH/SRS or receive PDCCH/PDSCH/CSI-RS for tracking/CSI-RS for channel quality indicator (CQI) on symbol(s) to be measured in the L1-RSRP measurement(s). In an example, the symbol(s) are time-domain resources of RS(s) for L1-RSRP measurements. Therefore, when the scheduling restriction is applied, the electronic device 110 is not expected to transmit PUCCH, PUSCH, and SRS transmission for UL orthogonal frequency-division multiplexing (OFDM) symbols with scheduling restriction. The electronic device 110 is also not expected to receive PDCCH, PDSCH, a CSI-RS for tracking, and a CSI-RS for CQI on DL OFDM symbols with scheduling restriction.

Scheduling restriction can be optimized, and thus unnecessary scheduling restriction can be minimized or avoided to improve system performance, such as increasing the system efficiency. Meanwhile, suitable measurement and/or Rx beam training can be provided.

As described above, the transceiver 130 can be configured to receive from the network 101 the configuration information to configure the measurement resource for the signal quality measurement. The signal quality measurement can determine the signal quality of a RS from the network 101 to the electronic device 110. In an embodiment, the signal quality of the RS includes a L1-RSRP for the RS and the signal quality measurement includes an L1-RSRP measurement. According to aspects of the disclosure, the processing circuitry 150 can be configured to determine whether to apply the scheduling restriction based on the configuration information received by the transceiver 130. In response to applying the scheduling restriction, the processing circuitry 150 can further determine when to apply the scheduling restriction based at least on the resource type of the measurement resource. The resource type can be one of periodic, semi-persistent, and aperiodic corresponding to a periodic resource (e.g., a SSB resource, a periodic CSI-RS resource), a semi-persistent resource (e.g., a semi-persistent CSI-RS resource), and an aperiodic resource (e.g., an aperiodic CSI-RS resource). In an example, the processing circuitry 150 is configured to determine which symbol(s) to be measured for the signal quality measurements (e.g., L1-RSRP measurements) based at least on the resource type of the measurement resource and the scheduling restriction can be applied to the symbol(s) to be measured.

Figure 2:
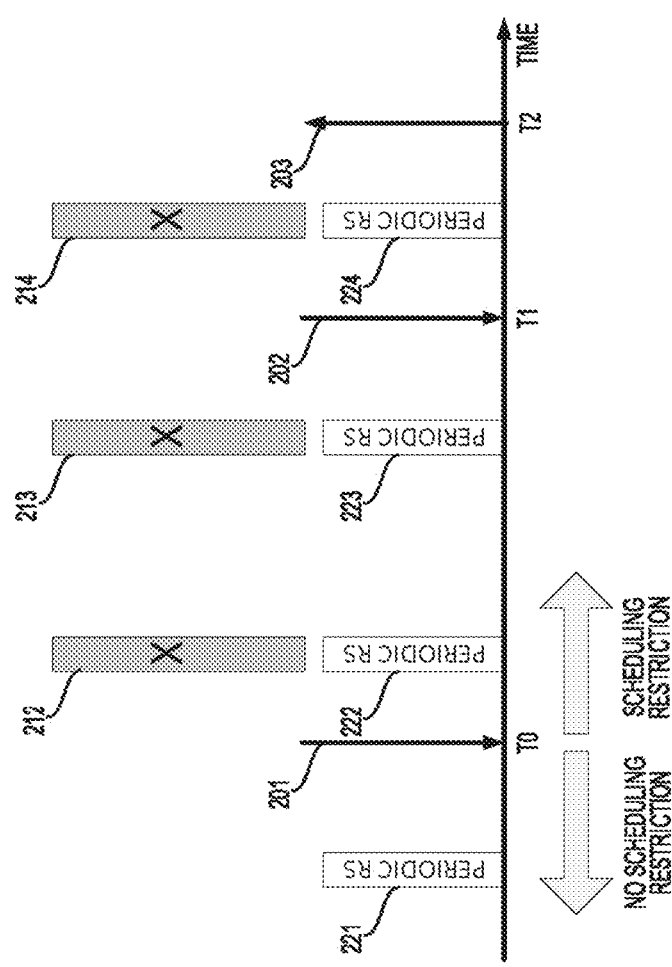
FIG. 2-FIG. 4 show examples of scheduling restrictions when a measurement resource is a periodic resource according to embodiments of the disclosure.
Figure 3:
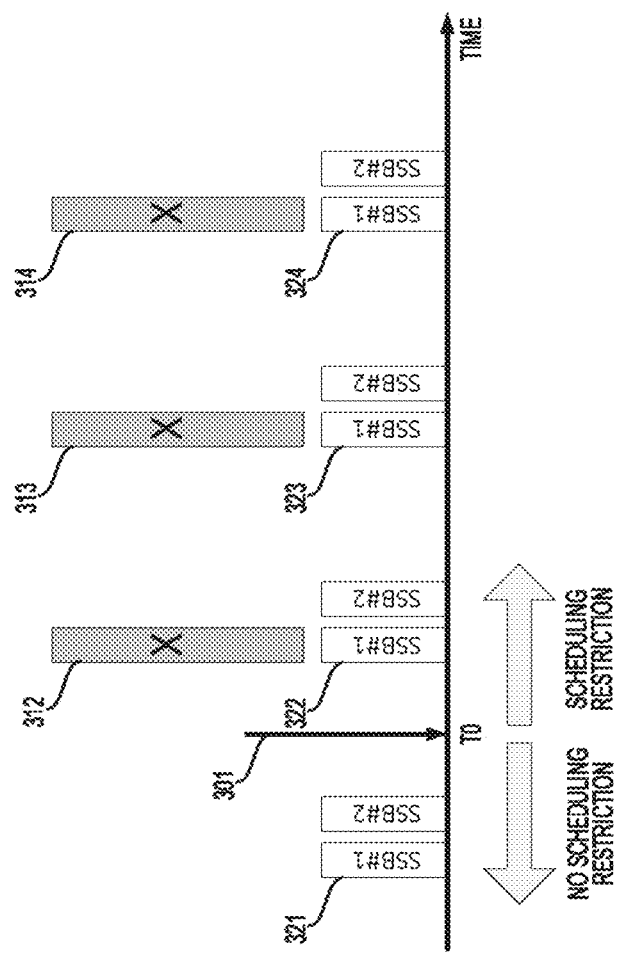
Figure 4:
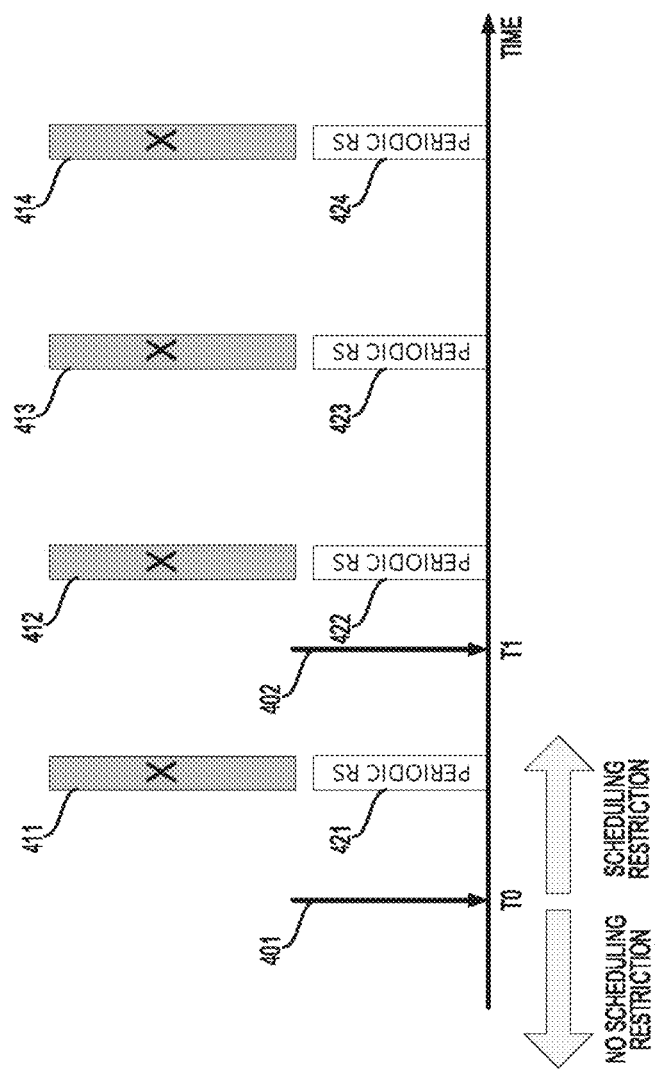

The configuration information can include the reporting configuration for the reporting of the signal quality. The reporting can be periodic, semi-persistent, or aperiodic. In an embodiment, the measurement resource that is configured is the periodic resource (or the resource type is periodic), such as a periodic CSI-RS resource or at least one SSB resource. The processing circuitry 150 can apply the scheduling restriction when the reporting of the signal quality is configured for the signal quality measurement based on the reporting configuration. Parameter(s) of the measurement resource can be configured prior to the configuration of the reporting of the signal quality or at a same time when the reporting is configured. FIGS. 2-4 show examples of scheduling restrictions when the measurement resource is the periodic resource.

When the measurement resource is the periodic resource, the measurement resource can be the periodic CSI-RS resource or the at least one SSB resource. In an example, the measurement resource is the at least one SSB configured for the signal quality measurement and the at least one SSB corresponds to at least one SSB index. When the reporting of the signal quality is configured for the signal quality measurement, the processing circuitry 150 can apply the scheduling restriction by allowing the signal quality measurement on symbols corresponding to the at least one SSB index and disallowing UL transmission and/or DL reception by the electronic device 110 on the symbols corresponding to the at least one SSB index. In an example, the measurement resource is the periodic CSI-RS resource configured for the signal quality measurement. When the reporting of the signal quality is configured for the signal quality measurement, the processing circuitry 150 can apply the scheduling restriction by allowing the signal quality measurement on at least one symbol corresponding to the periodic CSI-RS resource and disallowing UL transmission and/or DL reception by the electronic device 110 on the at least one symbol corresponding to the periodic CSI-RS resource.

The configuration information can indicate the reporting configuration for the reporting of the signal quality where the reporting can be semi-persistent or aperiodic. The measurement resource that is configured can be a semi-persistent CSI-RS resource or an aperiodic CSI-RS. The processing circuitry 150 can apply the scheduling restriction when (i) the reporting for the signal quality is configured for the signal quality measurement based on the reporting configuration and (ii) at least one of the measurement resource and the reporting is triggered or activated by the network 101. FIGS. 5A, 5B, 6A, 6B, and 7 show examples of scheduling restrictions when the measurement resource is the semi-persistent CSI-RS resource or the aperiodic CSI-RS and the reporting is semi-persistent or aperiodic.

In an example, the measurement resource is the semi-persistent CSI-RS resource and the reporting is semi-persistent. The configuration information can further indicate whether a MAC-CE is used to activate the scheduling restriction or DCI is used to trigger the scheduling restriction. If the configuration information indicates that the MAC-CE is used, the MAC-CE can be received by the transceiver 130 to activate the measurement resource and the reporting. When reporting for the signal quality is configured for the signal quality measurement and the measurement resource and the reporting are activated by the network 101 via the MAC-CE, the processing circuitry 150 can apply the scheduling restriction by allowing the signal quality measurement on at least one symbol corresponding to the semi-persistent CSI-RS resource and disallowing UL transmission and/or DL reception by the electronic device 110 on the at least one symbol corresponding to the semi-persistent CSI-RS resource that is activated.

If the configuration information indicates that the DCI is used, the DCI can be received by the transceiver 130 to trigger the measurement resource and the reporting. When reporting for the signal quality is configured for the signal quality measurement and the measurement resource and the reporting are triggered by the network 101 via the DCI, the processing circuitry 150 can apply the scheduling restriction by allowing the signal quality measurement on at least one symbol corresponding to the semi-persistent CSI-RS resource and disallowing UL transmission and/or DL reception by the electronic device 110 on the at least one symbol corresponding to the semi-persistent CSI-RS resource that is triggered.

In an example, the measurement resource is the semi-persistent CSI-RS resource and the reporting is aperiodic. The configuration information can further indicate whether a MAC-CE is used to activate the scheduling restriction or DCI is used to trigger the scheduling restriction. If the configuration information indicates that the MAC-CE is used, the MAC-CE can be received by the transceiver 130 to activate the measurement resource. When reporting for the signal quality is configured for the signal quality measurement and the measurement resource is activated by the network 101 via the MAC-CE, the processing circuitry 150 can apply the scheduling restriction by allowing the signal quality measurement on at least one symbol corresponding to the semi-persistent CSI-RS resource and disallowing UL transmission and/or DL reception by the electronic device 110 on the at least one symbol corresponding to the semi-persistent CSI-RS resource that is activated.

If the configuration information indicates that the DCI is used, the DCI can be received by the transceiver 130 to trigger the measurement resource. When reporting for the signal quality is configured for the signal quality measurement and the measurement resource is triggered by the network 101 via the DCI, the processing circuitry 150 can apply the scheduling restriction by allowing the signal quality measurement on at least one symbol corresponding to the semi-persistent CSI-RS resource and disallowing UL transmission and/or DL reception by the electronic device 110 on the at least one symbol corresponding to the semi-persistent CSI-RS resource that is triggered.

In an example, the measurement resource is the aperiodic CSI-RS resource and the reporting is aperiodic. The configuration information can further indicate DCI is used to trigger the scheduling restriction. The DCI can be received by the transceiver 130 to trigger the measurement resource and the reporting. When reporting for the signal quality is configured for the signal quality measurement and the measurement resource and the reporting are triggered by the network 101 via the DCI, the processing circuitry 150 can apply the scheduling restriction by allowing the signal quality measurement on at least one symbol corresponding to the aperiodic CSI-RS resource and disallowing UL transmission and/or DL reception by the electronic device 110 on the at least one symbol corresponding to the aperiodic CSI-RS resource that is triggered.

In an embodiment, the processing circuitry 150 can determine whether to apply the scheduling restriction as described below. When the measurement resource satisfies a condition, no scheduling restriction is applied to the measurement resource. The condition can include that (i) the measurement resource is a CSI-RS, (ii) the CSI-RS is quasi co-located (QCLed) with an active transmission configuration indicator (TCI) state for PDSCH/PDCCH, (iii) the CSI-RS is not in a CSI-RS resource set with a higher layer parameter 'repetition' being ON, and (iv) the CSI-RS is in a CSI-RS resource set with the higher layer parameter 'repetition' set to OFF. When the measurement resource does not satisfy the condition, the processing circuitry 150 can determine that the scheduling restriction is applicable to the measurement resource. In an example, when the CSI-RS is quasi co-located (QCLed) with an active TCI state for PDSCH/PDCCH, the CSI-RS is in a CSI-RS resource set with the higher layer parameter 'repetition' set to OFF. Accordingly, no Rx beam training or sweeping is required, and thus no scheduling restriction is applied.

The processing circuitry 150 can be implemented using various techniques, such as integrated circuits, one or more processors executing software instructions, and the like.

The memory 146 can be any suitable device for storing data and instructions to control operations of the electronic device 110. In an example, the memory 146 stores information and instructions associated with the signal quality measurement (e.g., RSRP measurements, L1-RSRP measurements) and reporting, scheduling restriction, and the like and software instructions to be executed by a processor, such as the processing circuitry 150. The memory 146 can store signal qualities (e.g., L1-RSRPs), configuration information, and/or the like.

In an embodiment, the memory 146 can be non-volatile memory, such as read-only memory, flash memory, magnetic computer storage devices, hard disk drives, solid state drives, floppy disks, and magnetic tape, optical discs, and the like. In an embodiment, the memory 146 can be a random access memory (RAM). In an embodiment, the memory 146 can include non-volatile memory and volatile memory.

FIG. 2-FIG. 4 show examples of scheduling restrictions when the measurement resource is a periodic resource according to embodiments of the disclosure. The configuration information can include the reporting configuration for the reporting of the signal quality. The measurement resource is configured and is the periodic resource (or the resource type is periodic), such as a periodic CSI-RS resource or at least one SSB resource. The periodic CSI-RS does not satisfy the condition described above. For example, the periodic CSI-RS is not quasi co-located with an active TCI state for PDSCH/PDCCH and/or the periodic CSI-RS is in a CSI-RS resource set with a higher layer parameter 'repetition' being ON. The processing circuitry 150 can apply the scheduling restriction when the reporting of the signal quality is configured for the signal quality measurement based on the reporting configuration. Parameter(s) of the measurement resource can be configured prior to the configuration of the reporting of the signal quality or at a same time when the reporting is configured. In an example, the signal quality is the L1-RSRP and the signal quality measurement is the L1-RSRP measurement.

Referring to FIG. 2, the measurement resource is the periodic RS resource configured. The reporting is aperiodic. The aperiodic reporting is configured at a time T0 indicated by an arrow 201. In an example, an index of the measurement resource is configured in the reporting configuration to link the measurement resource and the reporting. The aperiodic reporting is triggered at a time T1 indicated by an arrow 202, and the aperiodic reporting can occur at a time T2 indicated by an arrow 203. In an example shown in FIG. 2, the time T1 is later than the time T0 and is prior to the time T2. According to aspects of the disclosure, the processing circuitry 150 can apply the scheduling restriction when the aperiodic reporting of the signal quality is configured for the signal quality measurement and the periodic RS resource is configured. Thus, the processing circuitry 150 can apply the scheduling restriction to symbols 222-224 of the periodic RS and no scheduling restriction is applied to symbol(s) 221 of the periodic RS. Accordingly, no data in symbol durations 212-214 can be scheduled for UL transmission and/or DL reception corresponding to (e.g., at a same time) the symbols 222-224 of the periodic RS resource, respectively. The processing circuitry 150 can apply the scheduling restriction by allowing the signal quality measurement on the symbols 222-224 and disallowing the UL transmission and/or the DL reception by the electronic device 110 on the symbols 222-224.

Referring to FIG. 2, in some example, a maximum number of slots is 32 between the times T2 (e.g., the aperiodic reporting) and T1 (e.g., triggering of the aperiodic reporting). The maximum number of 32 slots may be insufficient for Rx beam training or sweeping in some scenarios. Accordingly, the scheduling restriction can be applied when the aperiodic reporting is configured at the time T0 instead of when the aperiodic reporting is triggered at the time T1.

Referring to FIG. 2, when to apply the scheduling restriction or to which symbol(s) the scheduling restriction is applied can depend on the configuration of the reporting and the periodic RS and does not depend on triggering of the reporting.

Referring to FIG. 3, in an embodiment, the measurement resource is the at least one SSB resource configured for the signal quality measurement (e.g., the L1-RSRP measurement). FIG. 3 shows two SSBs having SSB indices #1 and #2 (e.g., SSB #1 and SSB #2). The SSB #1 is configured for the signal quality measurement and the SSB #2 is not used for the signal quality measurement. Thus, the at least one SSB includes the SSB #1. Accordingly, no scheduling restriction is applied to symbols in the SSB #2, and the scheduling restriction may be applied to symbols in the SSB #1.

According to aspects of the disclosure, to which symbols of the SSB #1 the scheduling restriction is applied can be determined by a time T0 when the reporting of the signal quality measurement is configured. Referring to FIG. 3, the reporting of the signal quality measurement is configured at the time T0 that is indicated by an arrow 301. In an example, the reporting is a periodic reporting. Therefore, no scheduling restriction is applied to symbols 321 of the SSB #1 that are prior to the time T0 (e.g., the configuration of the reporting of the signal quality measurement) (e.g., the electronic device 110 does not know whether the SSB #1 is to be used for the signal quality measurement, such as an L1-RSRSP measurement, prior to the time T0). The scheduling restriction is applied to symbols 322-324 of the SSB #1 that are after the configuration of the reporting of the signal quality measurement. Accordingly, no data in symbol durations 312-314 can be scheduled for UL transmission and/or DL reception corresponding to (e.g., at a same time) the symbols 322-324 of the SSB #1, respectively. The processing circuitry 150 can apply the scheduling restriction by allowing the signal quality measurement on the symbols 322-324 corresponding to the at least one SSB index (e.g., the SSB #1) and disallowing the UL transmission and/or the DL reception by the electronic device 110 on the symbols 322-324 corresponding to the at least one SSB index (e.g., the SSB #1). In an example, the signal quality is the L1-RSRP and the signal quality measurement is the L1-RSRP measurement.

FIG. 3 can be suitably adapted to the periodic CSI-RS. For example, the SSB #1 can be replaced by the periodic CSI-RS and the SSB #2 can be omitted.

Referring to FIG. 4, the measurement resource is the periodic RS resource configured. The reporting is semi-persistent. The semi-persistent reporting is configured at a time T0 indicated by an arrow 401. According to aspects of the disclosure, the processing circuitry 150 can apply the scheduling restriction when the semi-persistent reporting of the signal quality is configured for the signal quality measurement and the periodic RS resource is configured. Thus, the processing circuitry 150 can apply the scheduling restriction to symbols 421-424 of the periodic RS. Accordingly, no data in symbol durations 411-414 can be scheduled for UL transmission and/or DL reception corresponding to (e.g., at a same time) the symbols 421-424 of the periodic RS resource, respectively. The processing circuitry 150 can apply the scheduling restriction by allowing the signal quality measurement on the symbols 421-424 and disallowing the UL transmission and/or the DL reception by the electronic device 110 on the symbols 421-424.

Referring to FIG. 4, the semi-persistent reporting is triggered (e.g., by DCI) or activated (e.g., by MAC-CE) at a time T1 indicated by an arrow 402. The time T1 is later than the time T0. The scheduling restriction depends on the time T0 when the semi-persistent reporting is configured and does not depend on the time T1 when the semi-persistent reporting is triggered or activated.

FIG. 5A, FIG. 5B, FIG. 6A, FIG. 6B, and FIG. 7 show examples of scheduling restrictions when the measurement resource is the semi-persistent CSI-RS resource or the aperiodic CSI-RS and the reporting is semi-persistent or aperiodic according to embodiments of the disclosure. The configuration information can indicate the reporting configuration for the reporting of the signal quality where the reporting can be semi-persistent or aperiodic. The processing circuitry 150 can apply the scheduling restriction when (i) the reporting for the signal quality is configured for the signal quality measurement based on the reporting configuration and (ii) at least one of the measurement resource and the reporting is triggered or activated by the network 101.

In an embodiment, the at least one of the measurement resource and the reporting includes the measurement resource and the reporting, and thus the measurement resource and the reporting are to be activated or triggered in order for the processing circuitry 150 to apply the scheduling restriction. When the measurement resource and the reporting are activated/triggered at two different times, the processing circuitry 150 is configured to apply the scheduling restriction after or at a later one of the different times, as shown in FIG. 5A-FIG. 5B.

Figure 5A:
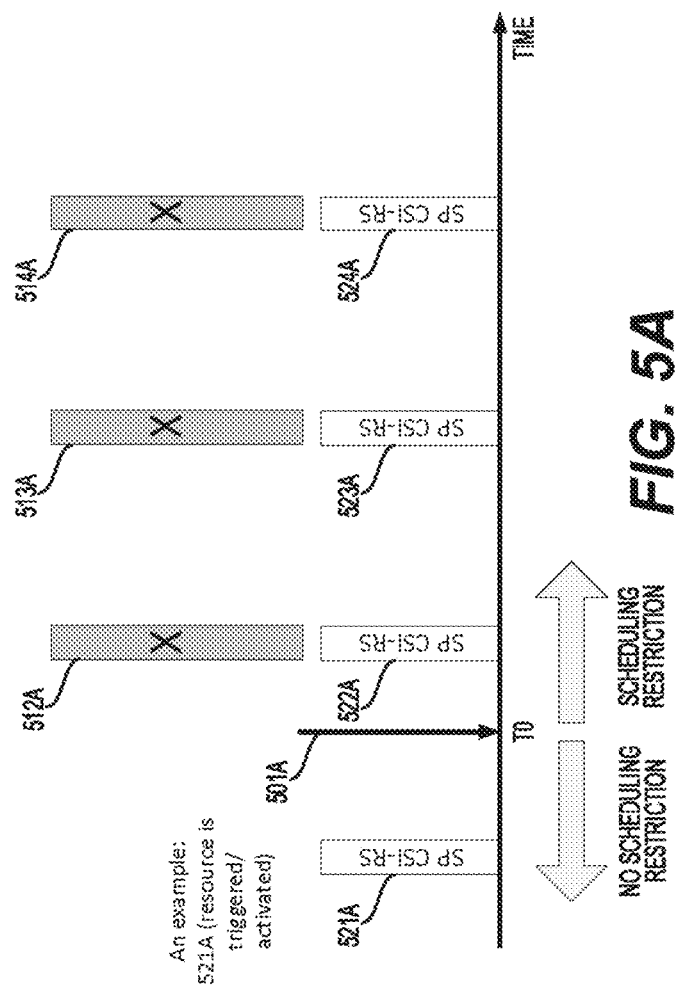
FIG. 5A and FIG. 5B show examples of scheduling restrictions when a measurement resource and a reporting are semi-persistent according to embodiments of the disclosure.

Referring to FIG. 5A, the measurement resource is the semi-persistent (SP) CSI-RS resource and is configured. The reporting is semi-persistent and is configured. The semi-persistent reporting is activated (e.g., by MAC-CE) or triggered (e.g., by DCI) by the network 101 at a time T0 indicated by an arrow 501A. In an example, the SP CSI-RS resource in FIG. 5A is activated or triggered prior to the time T0 or at the time T0. According to aspects of the disclosure, the processing circuitry 150 can apply the scheduling restriction when the semi-persistent reporting of the signal quality is configured for the signal quality measurement and the SP CSI-RS resource and the SP reporting are activated or triggered by the network 101 at the time T0. Thus, the processing circuitry 150 can apply the scheduling restriction to symbols 522A-524A of the SP CSI-RS resource and no scheduling restriction is applied to symbol(s) 521A of the SP CSI-RS resource. Accordingly, no data in symbol durations 512A-514A can be scheduled for UL transmission and/or DL reception corresponding to (e.g., at a same time) the symbols 522A-524A of the SP CSI-RS resource, respectively. The processing circuitry 150 can apply the scheduling restriction by allowing the signal quality measurement on the symbols 522A-524A and disallowing the UL transmission and/or the DL reception by the electronic device 110 on the symbols 522A-524A.

Figure 5B:
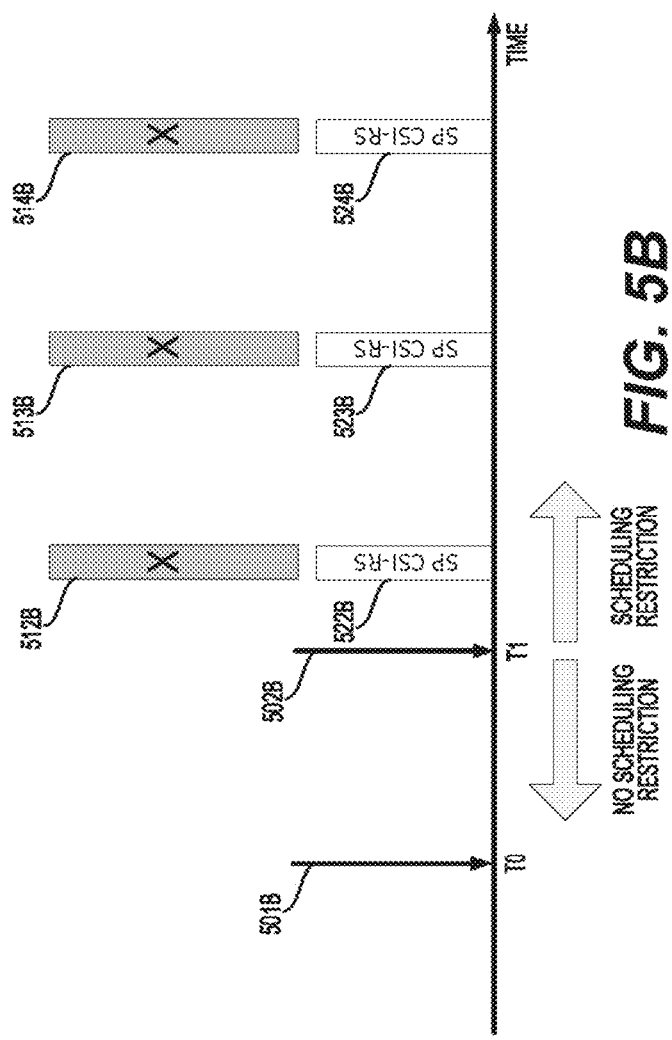

Referring to FIG. 5B, the measurement resource is the SP CSI-RS resource and is configured. The reporting is semi-persistent and is configured. The semi-persistent reporting is activated (e.g., by MAC-CE) or triggered (e.g., by DCI) by the network 101 at a time T0 indicated by an arrow 501B, and the SP CSI-RS resource is activated or triggered at a time T1 indicated by an arrow 502B. The time T1 is later than the time T0. According to aspects of the disclosure, the processing circuitry 150 can apply the scheduling restriction when the semi-persistent reporting of the signal quality is configured for the signal quality measurement and the SP CSI-RS resource and the SP reporting are activated or triggered by the network 101 at the time T1. Thus, the processing circuitry 150 can apply the scheduling restriction to symbols 522B-524B of the SP CSI-RS resource. Accordingly, no data in symbol durations 512B-514B can be scheduled for UL transmission and/or DL reception corresponding to (e.g., at a same time) the symbols 522B-524B of the SP CSI-RS resource, respectively. The processing circuitry 150 can apply the scheduling restriction by allowing the signal quality measurement on the symbols 522B-524B and disallowing the UL transmission and/or the DL reception by the electronic device 110 on the symbols 522B-524B.

Figure 6A:
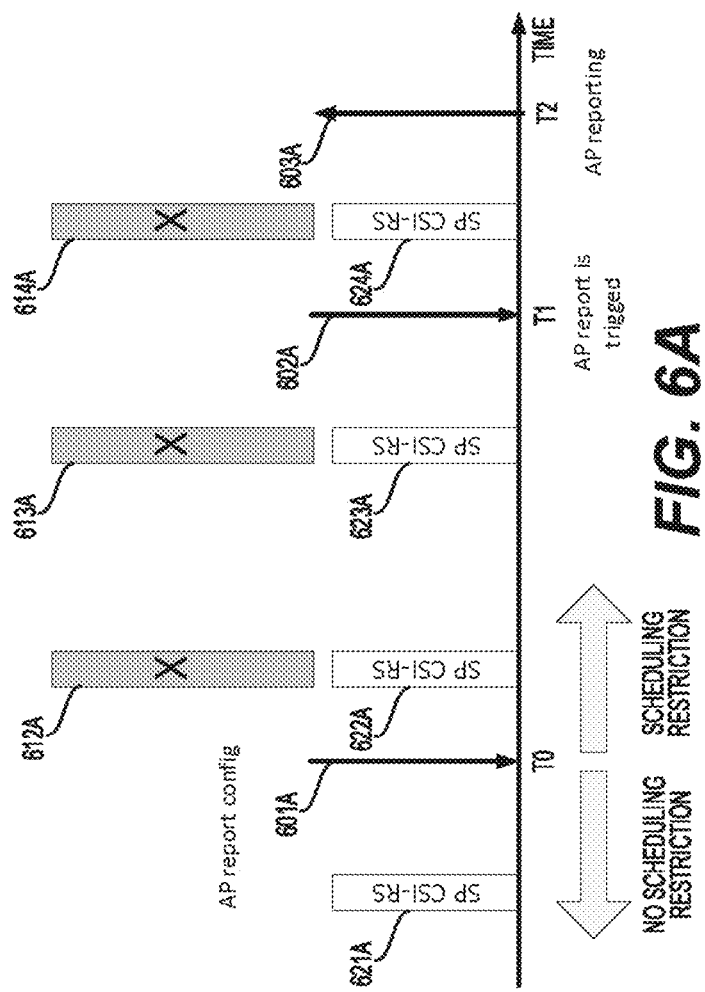
FIG. 6A and FIG. 6B show examples of scheduling restrictions when a measurement resource is semi-persistent and a reporting is aperiodic according to embodiments of the disclosure.

Referring to FIG. 6A, the measurement resource is the SP CSI-RS resource and is configured. The reporting is aperiodic. The aperiodic reporting is configured at a time T0 indicated by an arrow 601A. The aperiodic reporting is triggered (e.g., by DCI) by the network 101 at a time T1 indicated by an arrow 602A. The aperiodic reporting can occur at a time T2 indicated by an arrow 603A. The time T1 is after the time T0 and prior to the time T2. In an example, the SP CSI-RS resource in FIG. 6A is activated or triggered prior to the time T0 or at the time T0. According to aspects of the disclosure, the processing circuitry 150 can apply the scheduling restriction when the aperiodic reporting of the signal quality is configured for the signal quality measurement at the time T0 and the SP CSI-RS resource is activated or triggered by the network 101. Thus, the processing circuitry 150 can apply the scheduling restriction to symbols 622A-624A of the SP CSI-RS resource and no scheduling restriction is applied to symbol(s) 621A of the SP CSI-RS. Accordingly, no data in symbol durations 612A-614A can be scheduled for UL transmission and/or DL reception corresponding to (e.g., at a same time) the symbols 622A-624A of the SP CSI-RS resource, respectively. The processing circuitry 150 can apply the scheduling restriction by allowing the signal quality measurement on the symbols 622A-624A and disallowing the UL transmission and/or the DL reception by the electronic device 110 on the symbols 622A-624A.

Referring to FIG. 6A, the processing circuitry 150 is configured to apply the scheduling restriction when the aperiodic reporting is configured. Whether and when the aperiodic reporting is triggered does not affect the scheduling restriction. As described above with reference to FIG. 2, the maximum number of slots is 32 between the times T2 (e.g., the aperiodic reporting) and T1 (e.g., the triggering of the aperiodic reporting). The maximum number of 32 slots may be insufficient for Rx beam training or sweeping in some scenarios. Accordingly, the scheduling restriction is applied when the aperiodic reporting is configured at the time T0 instead of when the aperiodic reporting is triggered at the time T1.

Figure 6B:
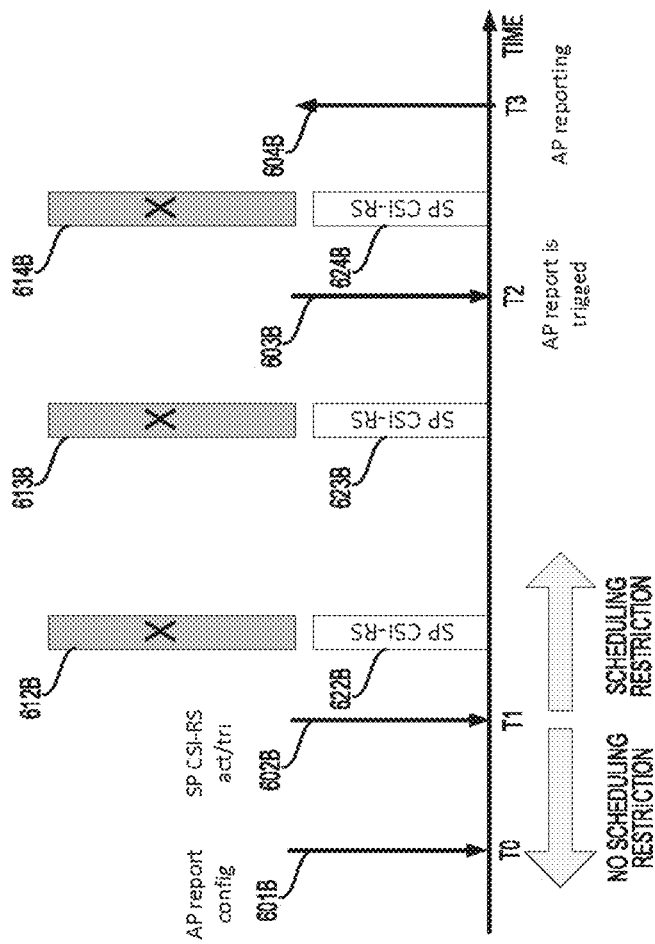

Referring to FIG. 6B, the measurement resource is the SP CSI-RS resource and is configured. The reporting is aperiodic. The aperiodic reporting is configured at a time T0 indicated by an arrow 601B. The SP CSI-RS resource is activated (e.g., by MAC-CE) or triggered (e.g., by DCI) by the network 101 at a time T1 indicated by an arrow 602B. The aperiodic reporting is triggered (e.g., by DCI) by the network 101 at a time T2 indicated by an arrow 603B. The aperiodic reporting can occur at a time T3 indicated by an arrow 604B. The time T1 is after the time T0 and prior to the time T2. According to aspects of the disclosure, the processing circuitry 150 can apply the scheduling restriction when the aperiodic reporting of the signal quality is configured for the signal quality measurement and the SP CSI-RS resource is activated or triggered by the network 101. Since the configuration of the aperiodic reporting and the activation/triggering of the SP CSI-RS resource occur at different times T0 an T1, the processing circuitry 150 can apply the scheduling restriction at a later one (e.g., T1) of the different times T0 and T1. Thus, the processing circuitry 150 can apply the scheduling restriction to symbols 622B-624B of the SP CSI-RS resource and no scheduling restriction is applied prior to the time T1. Accordingly, no data in symbol durations 612B-614B can be scheduled for UL transmission and/or DL reception corresponding to (e.g., at a same time) the symbols 622B-624B of the SP CSI-RS resource, respectively. The processing circuitry 150 can apply the scheduling restriction by allowing the signal quality measurement on the symbols 622B-624B and disallowing the UL transmission and/or the DL reception by the electronic device 110 on the symbols 622B-624B.

Referring to FIG. 6B, the processing circuitry 150 is configured to apply the scheduling restriction when the aperiodic reporting is configured and the SP CSI-RS is activated or triggered. Whether and when the aperiodic reporting is triggered does not affect the scheduling restriction. The maximum number of slots is 32 between the times T3 (e.g., the aperiodic reporting) and T2 (e.g., the triggering of the aperiodic reporting). The maximum number of 32 slots may be insufficient for Rx beam training or sweeping in some scenarios. Accordingly, the scheduling restriction is applied when the SP CSI-RS is activated or triggered at the time T1 instead of when the aperiodic reporting is triggered at the time T2.

Figure 7:
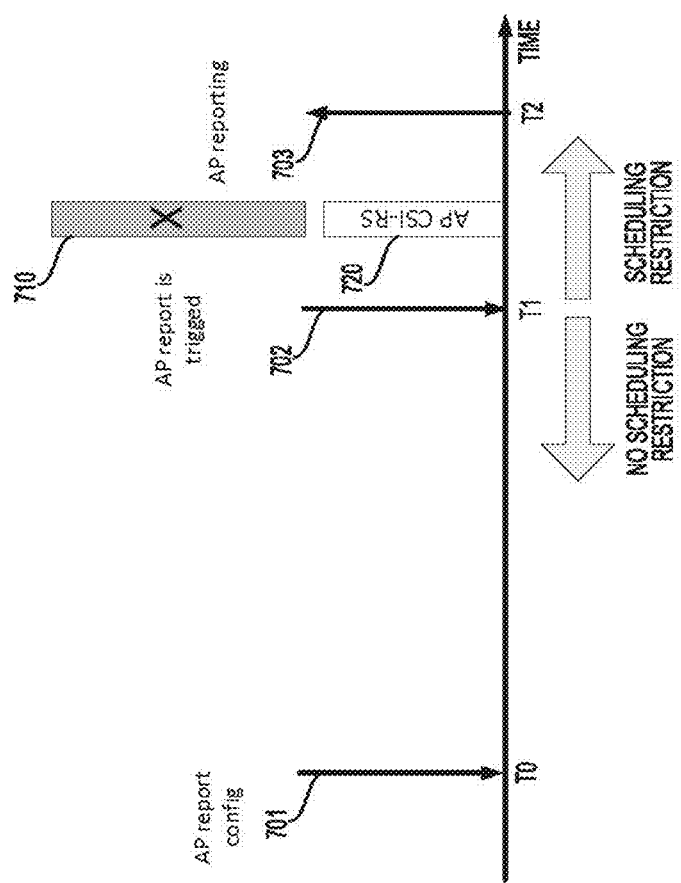
FIG. 7 shows an example of scheduling restrictions when a measurement resource and a reporting are aperiodic according to an embodiment of the disclosure.

Referring to FIG. 7, the measurement resource is the AP CSI-RS resource and is configured. The reporting is aperiodic. The aperiodic reporting is configured at a time T0 indicated by an arrow 701. The aperiodic reporting and the AP CSI-RS resource are triggered (e.g., by DCI) by the network 101 at a time T1 indicated by an arrow 702. The aperiodic reporting can occur at a time T2 indicated by an arrow 703. The time T1 is after the time T0 and prior to the time T2. According to aspects of the disclosure, the processing circuitry 150 can apply the scheduling restriction when the aperiodic reporting of the signal quality is configured for the signal quality measurement and the AP CSI-RS resource and the aperiodic reporting are triggered by the network 101. Thus, the processing circuitry 150 can apply the scheduling restriction to symbol(s) 720 of the AP CSI-RS resource and no scheduling restriction is applied prior to the time T1. Accordingly, no data in a symbol duration 710 can be scheduled for UL transmission and/or DL reception corresponding to (e.g., at a same time) the symbol(s) 720 of the AP CSI-RS resource. The processing circuitry 150 can apply the scheduling restriction by allowing the signal quality measurement on the symbol(s) 720 and disallowing the UL transmission and/or the DL reception by the electronic device 110 on the symbol(s) 720.

Table 1 shows examples of scheduling restriction according to embodiments of the disclosure as described above with reference to FIG. 1-FIG. 4, FIG. 5A, FIG. 5B, FIG. 6A, FIG. 6B, and FIG. 7.

Based on the first row of Table 1, for the periodic RS, the processing circuitry 150 can apply the scheduling restriction when the periodic RS and the reporting are configured.

Based on the second row and the second column of Table 1, for the SP RS and the semi-persistent reporting, the processing circuitry 150 can apply the scheduling restriction when the SP RS and the reporting are (i) configured and (ii) activated or triggered.

Based on the second row and the third column of Table 1, for the SP RS and the aperiodic reporting, the processing circuitry 150 can apply the scheduling restriction when the SP RS and the aperiodic reporting are configured and the SP RS is activated or triggered.

Based on the third row and the third column of Table 1, for the aperiodic RS and the aperiodic reporting, the processing circuitry 150 can apply the scheduling restriction when the aperiodic RS and the aperiodic reporting are configured and triggered.

Figure 8:
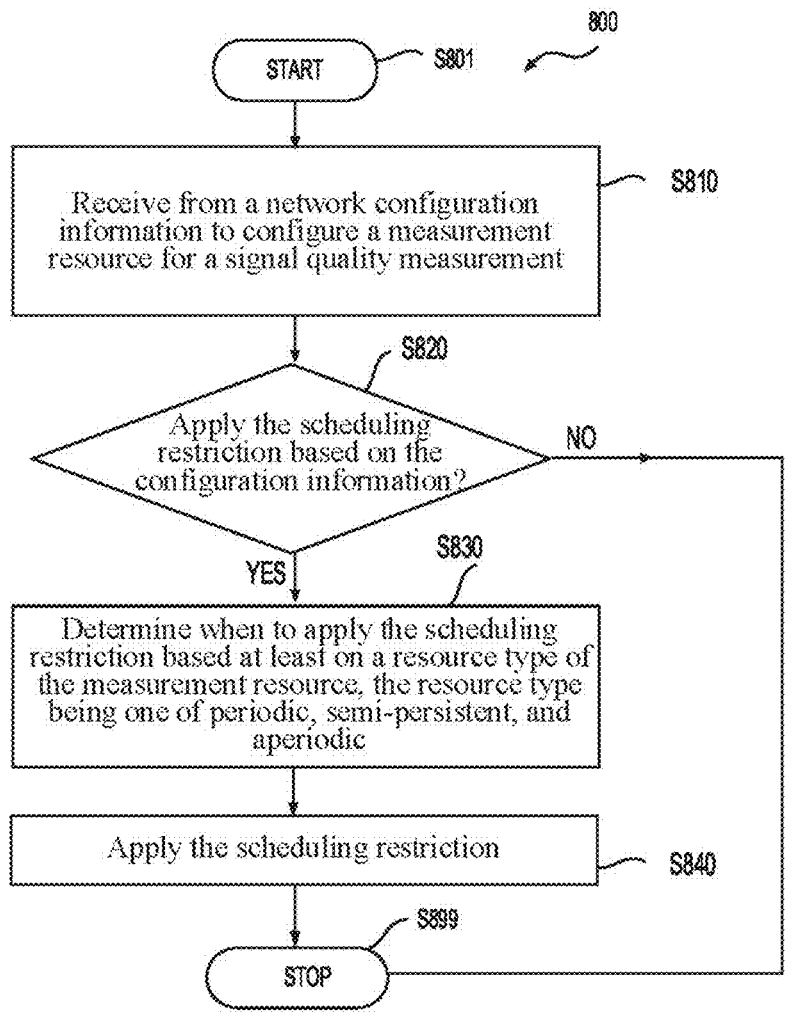
FIG. 8 shows a flow chart of an exemplary process 800 according to an embodiment of the disclosure.

FIG. 8 shows a flow chart of an exemplary process 800 according to an embodiment of the disclosure. The process 800 can be used to implement scheduling restriction. In an example, an electronic device, such as the electronic device 110, is configured to perform the process 800. The process 800 starts at S801, and proceeds to S810.

At S810, configuration information to configure a measurement resource for a signal quality measurement can be received, for example, by a transceiver of the electronic device from a network (e.g., the network 101). The signal quality measurement can determine a signal quality of a reference signal from the network to the electronic device. The reference signal can be a CSI-RS or SSB(s). The reference signal can be a periodic RS (e.g., a periodic CSI-RS or SSB(s)), a SP RS (e.g., a SP CSI-RS), or an aperiodic RS (e.g., an aperiodic CSI-RS). The signal quality can include RSRP, such as L1-RSRP, and the signal quality measurement can include an L1-RSRP measurement.

The configuration information can include a RRC configuration from the network and indicate a resource configuration for the measurement resource and a reporting configuration for a reporting of the signal quality. For example, the resource configuration indicates that the measurement resource is a SSB, a periodic CSI-RS resource, a semi-persistent CSI-RS resource, or an aperiodic CSI-RS resource. The reporting configuration (e.g., reportConfig) indicates that the reporting is periodic, semi-persistent, and or aperiodic. The configuration information can further indicate whether a MAC-CE is used to activate the scheduling restriction or DCI is used to trigger the scheduling restriction.

At (S820), whether to apply the scheduling restriction can be determined, for example, by processing circuitry of the electronic device, based on the configuration information.

In an embodiment, when the measurement resource is a CSI-RS, the CSI-RS is quasi co-located (QCLed) with an active TCI state for PDSCH/PDCCH, the CSI-RS is not in a CSI-RS resource set with a higher layer parameter 'repetition' being ON, and the CSI-RS is in a CSI-RS resource set with the higher layer parameter 'repetition' set to OFF, no scheduling restriction is applied due to L1-RSRP measurement performed based on the CSI-RS. The process 800 proceeds to S899, and terminates. Otherwise, the scheduling restriction is determined to be applicable to the measurement resource, such as the RS for L1-RSRP measurement, and the process 800 proceeds to S830.

At S830, when to apply the scheduling restriction can be determined based at least on the resource type of the

TABLE 1

Examples of scheduling restrictions

| | Periodic reporting | Semi-persistent reporting | Aperiodic reporting |
|---|---|---|---|
| Periodic RS (e.g., periodic CSI-RS or SSB) | The periodic RS and the periodic reporting are configured. | The periodic RS and the semi-persistent reporting are configured. | The periodic RS and the aperiodic reporting are configured. |
| Semi-persistent RS (e.g., semi-persistent CSI-RS) | N/A | The semi-persistent RS and the semi-persistent reporting are (i) configured and (ii) activated or triggered. | (i) The semi-persistent RS and the aperiodic reporting are configured; (ii) The semi-persistent RS is activated or triggered. |
| Aperiodic RS (e.g., aperiodic CSI-RS) | N/A | N/A | The aperiodic RS and the aperiodic reporting are configured and triggered. | measurement resource, as described above with references to FIGS. 1-4, 5A, 5B, 6A, 6B, and 7. The resource type can be one of periodic, semi-persistent, and aperiodic.

At S840, the scheduling restriction that is determined in S830 can be applied.

Some examples of S830 and S840 are given below. According to aspects of the disclosure, at S830, if the measurement resource is periodic, the scheduling restriction can be applied when the measurement resource and the reporting are configured, as shown in FIGS. 2-4. At S840, in an example, the electronic device is not expected to transmit PUCCH/PUSCH/SRS or receive PDCCH/PDSCH/CSI-RS for tracking/CSI-RS for CQI on symbol(s) corresponding to one or more SSB SSB indices configured for L1-RSRP measurement(s). In an example, the electronic device is not expected to transmit PUCCH/PUSCH/SRS or receive PDCCH/PDSCH/CSI-RS for tracking/CSI-RS for CQI on symbol(s) corresponding to a periodic CSI-RS resource configured for L1-RSRP measurement(s).

According to aspects of the disclosure, at S830, if the measurement resource is semi-persistent, such as a SP CSI-RS resource, the scheduling restriction can be applied when (a) the measurement resource and the reporting are configured and (b) at least one of the measurement resource and the reporting is activated or triggered, as shown in FIGS. 5A, 5B, 6A, and 6B. At S840, in an embodiment, the electronic device is not expected to transmit PUCCH/PUSCH/SRS or receive PDCCH/PDSCH/CSI-RS for tracking/CSI-RS for CQI on symbol(s) corresponding to the SP CSI-RS resource configured for L1-RSRP measurement(s) when the SP CSI-RS resource is activated or triggered. In an example, the reporting is semi-persistent, and the electronic device is not expected to transmit PUCCH/PUSCH/SRS or receive PDCCH/PDSCH/CSI-RS for tracking/CSI-RS for CQI on the symbol(s) corresponding to the SP CSI-RS resource configured for L1-RSRP measurement(s) when the SP CSI-RS resource and the SP reporting are activated or triggered. In an example, the reporting is aperiodic, and the electronic device is not expected to transmit PUCCH/PUSCH/SRS or receive PDCCH/PDSCH/CSI-RS for tracking/CSI-RS for CQI on the symbol(s) corresponding to the SP CSI-RS resource configured for L1-RSRP measurement (s) when the SP CSI-RS resource is activated or triggered.

According to aspects of the disclosure, at S830, if the measurement resource is aperiodic, such as an aperiodic CSI-RS resource, the scheduling restriction can be applied when (a) the measurement resource and the reporting are configured and (b) the measurement resource and the reporting are triggered, as shown in FIG. 7. Accordingly, at S840, the electronic device is not expected to transmit PUCCH/PUSCH/SRS or receive PDCCH/PDSCH/CSI-RS for tracking/CSI-RS for CQI on symbol(s) corresponding to the aperiodic CSI-RS resource configured for L1-RSRP measurement(s) when the aperiodic CSI-RS resource and reporting are triggered.

The process 800 can be suitably adapted to various scenarios and steps in the process 800 can be adjusted accordingly. One or more of the steps in the process 800 can be adapted, omitted, repeated, and/or combined. Any suitable order can be used to implement the process 800. Additional step(s) can be added.

Figure 9A:
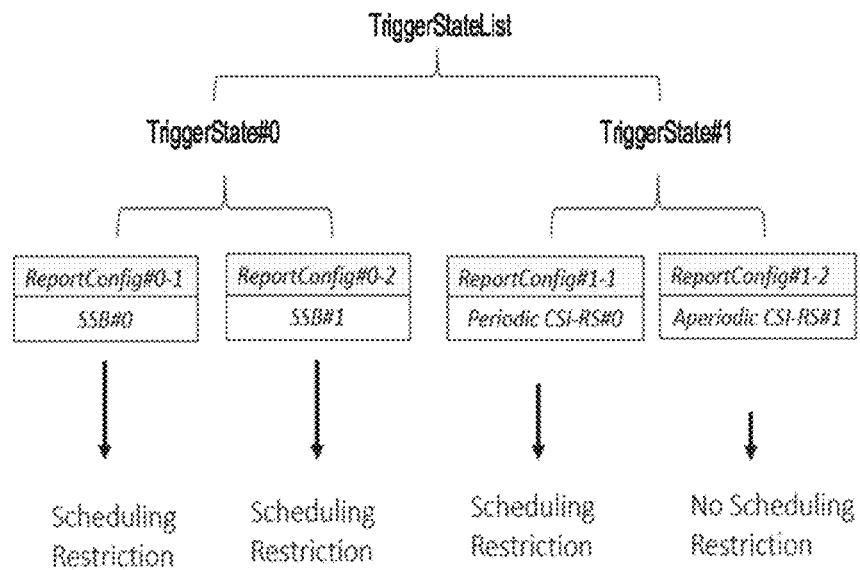
FIG. 9A shows examples of scheduling restrictions according to embodiments of the disclosure.

FIG. 9A shows examples of scheduling restrictions according to embodiments of the disclosure. In an example, for L1-RSRP, an electronic device (e.g., the electronic device 110) is configured by higher layers with a reporting configuration, a resource configuration, and one or more list(s) (e.g., TriggerStateList) of trigger states. Referring to FIG. 9A, a trigger state list (or TriggerStateList) includes two trigger states, a trigger state #0 (or TriggerState #0) and a trigger state #1 (or TriggerState #1). Further, each trigger state in the TriggerStateList can include a list of associated report configuration indicating resource set identifications (IDs). For example, the TriggerState #0 includes a report configuration #0 (e.g., ReportConfig #0), and the Trigger-State #1 includes a report configuration #1 (e.g., Report-Config #1). The report configuration #0 further includes a ReportConfig #0-1 for a first SSB having a SSB index of SSB #0 and a ReportConfig #0-2 for a second SSB having a SSB index of SSB #1. The report configuration #1 further includes a ReportConfig #1-1 for a periodic CSI-RS #0 and a ReportConfig #1-2 for an aperiodic CSI-RS #1. In an example, TCI is not provided for the periodic CSI-RS #0 and TCI is provided to the aperiodic CSI-RS #1. Further, the aperiodic CSI-RS #1 is not in a resource set with repetition ON.

Referring to FIG. 9A, the trigger states TriggerState #0 and TriggerState #1 are aperiodic and the reporting for L1-RSRP measurements is aperiodic. According to aspects of the disclosure, scheduling restriction is applicable to the SSB #0, the SSB #1, and the periodic CSI-RS #0. However, there is no scheduling restriction for the aperiodic CSI-RS #1.

In some examples, scheduling restriction is applicable to one or more SSBs.

Figure 9B:
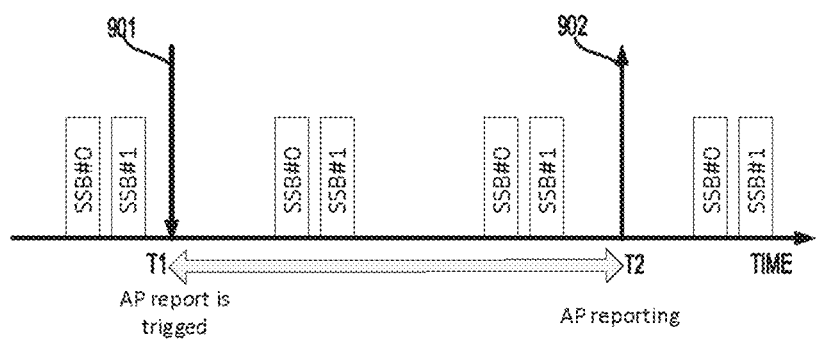
FIG. 9B shows a timeline of an aperiodic reporting for SSBs according to an embodiment of the disclosure.

FIG. 9B shows a timeline of an aperiodic reporting for SSBs according to an embodiment of the disclosure. For the periodic resource SSB #0 and SSB #1, the aperiodic reporting is triggered (TriggerState #0) at a time T1 indicated by an arrow 901 and the aperiodic reporting can occur at a time T2 indicated by an arrow 902. In an example, a maximum duration between the times T2 and T1 (e.g., set by report-SlotOffsetList) is 32 slots and may not be sufficient for Rx beam training or sweeping. Accordingly, the scheduling restriction can occur when the aperiodic reporting is configured, and thus prior to the triggering of the aperiodic reporting at the time T1, as shown in FIG. 2.

Embodiments in the disclosure may be used separately or combined in any order. Further, each of the methods (or embodiments) may be implemented by processing circuitry (e.g., one or more processors or one or more integrated circuits). In one example, the one or more processors execute a program that is stored in a non-transitory computer-readable medium.

The various circuitry, circuits, components, modules, and the like in the present disclosure can be implemented using any suitable technology, such as an integrated circuit (IC), ICs, digital signal processors (DSPs), microprocessors, CPUs, field programmable gate arrays (FPGAs), Application-specific integrated circuits (ASICs), and the like. In an example, the various circuitry, components, modules, and the like can also include one or more processing circuits executing software instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method for scheduling restriction, comprising:
receiving, by a transceiver of an electronic device from a network, configuration information to configure a measurement resource for a signal quality measurement, the signal quality measurement determining a signal quality of a reference signal from the network to the electronic device;

determining, by processing circuitry of the electronic device, whether to apply the scheduling restriction based on the configuration information; and in response to applying the scheduling restriction, determining when to apply the scheduling restriction based at least on a resource type of the measurement resource, the resource type being one of periodic, semi-persistent, and aperiodic.

2. The method according to claim 1, wherein the signal quality of the reference signal includes a layer 1 (L1) reference signal received power (L1-RSRP) for the reference signal and the signal quality measurement includes an L1-RSRP measurement.

3. The method according to claim 1, wherein the configuration information further includes a reporting configuration for a reporting of the signal quality;

the measurement resource that is configured based on the configuration information is a periodic channel-state information reference signal (CSI-RS) resource or at least one synchronization signal block (SSB) and the resource type is periodic; and determining when to apply the scheduling restriction includes applying the scheduling restriction when the reporting of the signal quality is configured for the signal quality measurement based on the reporting configuration.

4. The method according to claim 3, wherein the measurement resource is the at least one SSB configured for the signal quality measurement, the at least one SSB corresponding to at least one SSB index; and applying the scheduling restriction includes:

allowing the signal quality measurement on symbols corresponding to the at least one SSB index; and disallowing uplink (UL) transmission and/or downlink (DL) reception by the electronic device on the symbols corresponding to the at least one SSB index.

5. The method according to claim 3, wherein the measurement resource is the periodic CSI-RS resource configured for the signal quality measurement; and applying the scheduling restriction includes:

allowing the signal quality measurement on at least one symbol corresponding to the periodic CSI-RS resource; and disallowing UL transmission and/or DL reception by the electronic device on the at least one symbol corresponding to the periodic CSI-RS resource.

6. The method according to claim 1, wherein the configuration information further indicates a reporting configuration for a reporting of the signal quality, the reporting being semi-persistent or aperiodic;

the measurement resource that is configured based on the configuration information is a semi-persistent CSI-RS resource or an aperiodic CSI-RS; and determining when to apply the scheduling restriction includes applying the scheduling restriction when (i) the reporting for the signal quality is configured for the signal quality measurement based on the reporting configuration and (ii) at least one of the measurement resource and the reporting is triggered or activated by the network.

7. The method according to claim 6, wherein the at least one of the measurement resource and the reporting includes the measurement resource and the reporting;

the reporting is semi-persistent, the measurement resource is the semi-persistent CSI-RS resource, and the configuration information further indicates whether a medium access control-control element (MAC-CE) is used to activate the scheduling restriction or downlink control information (DCI) is used to trigger the scheduling restriction;

when the configuration information indicates that the MAC-CE is used, the method further includes receiving the MAC-CE to activate the measurement resource and the reporting;

when the configuration information indicates that the DCI is used, the method further includes receiving the DCI to trigger the measurement resource and the reporting; and applying the scheduling restriction includes:

allowing the signal quality measurement on at least one symbol corresponding to the semi-persistent CSI-RS resource; and disallowing UL transmission and/or DL reception by the electronic device on the at least one symbol corresponding to the semi-persistent CSI-RS resource.

8. The method according to claim 6, wherein the at least one of the measurement resource and the reporting includes the measurement resource;

the reporting is aperiodic, the measurement resource is the semi-persistent CSI-RS resource, the configuration information further indicates whether a MAC-CE is used to activate the scheduling restriction or DCI is used to trigger the scheduling restriction;

when the configuration information indicates that the MAC-CE is used, the method further includes receiving the MAC-CE to activate the measurement resource;

when the configuration information indicates that the DCI is used, the method further includes receiving the DCI to trigger the measurement resource; and applying the scheduling restriction includes:

allowing the signal quality measurement on at least one symbol corresponding to the semi-persistent CSI-RS resource; and disallowing UL transmission and/or DL reception by the electronic device on the at least one symbol corresponding to the semi-persistent CSI-RS resource.

9. The method according to claim 6, wherein the at least one of the measurement resource and the reporting includes the measurement resource and the reporting;

the reporting is aperiodic, the measurement resource is the aperiodic CSI-RS resource, and the configuration information further indicates DCI is used to trigger the scheduling restriction;

the method further includes receiving the DCI to trigger the measurement resource and the reporting; and applying the scheduling restriction includes:

allowing the signal quality measurement on at least one symbol corresponding to the aperiodic CSI-RS resource; and disallowing UL transmission and/or DL reception by the electronic device on the at least one symbol corresponding to the aperiodic CSI-RS resource.

10. The method according to claim 1, wherein determining whether to apply the scheduling restriction comprises:

when the measurement resource satisfies a condition, no scheduling restriction is applied to the measurement resource, the condition including that (i) the measurement resource is a CSI-RS, (ii) the CSI-RS is quasi co-located with an active transmission configuration indicator (TCI) state for physical downlink shared channel (PDSCH)/physical downlink control channel (PDCCH), (iii) the CSI-RS is not in a CSI-RS resource set with a higher layer parameter 'repetition' being ON, and (iv) the CSI-RS is in a CSI-RS resource set with the higher layer parameter 'repetition' set to OFF; and when the measurement resource does not satisfy the condition, the scheduling restriction is determined to be applicable to the measurement resource.

11. An electronic device for scheduling restriction, comprising:
a transceiver that is configured to receive from a network configuration information to configure a measurement resource for a signal quality measurement, the signal quality measurement determining a signal quality of a reference signal from the network to the electronic device; and
processing circuitry configured to:
determine whether to apply the scheduling restriction based on the configuration information; and
in response to applying the scheduling restriction, determine when to apply the scheduling restriction based at least on a resource type of the measurement resource, the resource type being one of periodic, semi-persistent, and aperiodic.

12. The electronic device according to claim 11, wherein the signal quality of the reference signal includes a layer 1 (L1) reference signal received power (L1-RSRP) for the reference signal and the signal quality measurement includes an L1-RSRP measurement.

13. The electronic device according to claim 11, wherein
the configuration information further includes a reporting configuration for a reporting of the signal quality;
the measurement resource that is configured based on the configuration information is a periodic channel-state information reference signal (CSI-RS) resource or at least one synchronization signal block (SSB) and the resource type is periodic; and
the processing circuitry is configured to apply the scheduling restriction when the reporting of the signal quality is configured for the signal quality measurement based on the reporting configuration.

14. The electronic device according to claim 13, wherein
the measurement resource is the at least one SSB configured for the signal quality measurement, the at least one SSB corresponding to at least one SSB index; and
the processing circuitry is configured to:
allow the signal quality measurement on symbols corresponding to the at least one SSB index; and
disallow uplink (UL) transmission and/or downlink (DL) reception by the electronic device on the symbols corresponding to the at least one SSB index.

15. The electronic device according to claim 13, wherein
the measurement resource is the periodic CSI-RS resource configured for the signal quality measurement; and
the processing circuitry is configured to:
allow the signal quality measurement on at least one symbol corresponding to the periodic CSI-RS resource; and
disallow UL transmission and/or DL reception by the electronic device on the at least one symbol corresponding to the periodic CSI-RS resource.

16. The electronic device according to claim 11, wherein
the configuration information further indicates a reporting configuration for a reporting of the signal quality, the reporting being semi-persistent or aperiodic;
the measurement resource that is configured based on the configuration information is a semi-persistent CSI-RS resource or an aperiodic CSI-RS; and
the processing circuitry is configured to apply the scheduling restriction when (i) the reporting for the signal quality is configured for the signal quality measurement based on the reporting configuration and (ii) at least one of the measurement resource and the reporting is triggered or activated by the network.

17. The electronic device according to claim 16, wherein
the at least one of the measurement resource and the reporting includes the measurement resource and the reporting;
the reporting is semi-persistent, the measurement resource is the semi-persistent CSI-RS resource, and the configuration information further indicates whether a medium access control-control element (MAC-CE) is used to activate the scheduling restriction or downlink control information (DCI) is used to trigger the scheduling restriction;
when the configuration information indicates that the MAC-CE is used, the transceiver is configured to receive the MAC-CE to activate the measurement resource and the reporting;
when the configuration information indicates that the DCI is used, the transceiver is configured to receive the DCI to trigger the measurement resource and the reporting; and
the processing circuitry is configured to:
allow the signal quality measurement on at least one symbol corresponding to the semi-persistent CSI-RS resource; and
disallow UL transmission and/or DL reception by the electronic device on the at least one symbol corresponding to the semi-persistent CSI-RS resource.

18. The electronic device according to claim 16, wherein
the at least one of the measurement resource and the reporting includes the measurement resource;
the reporting is aperiodic, the measurement resource is the semi-persistent CSI-RS resource, the configuration information further indicates whether a MAC-CE is used to activate the scheduling restriction or DCI is used to trigger the scheduling restriction;
when the configuration information indicates that the MAC-CE is used, the transceiver is configured to receive the MAC-CE to activate the measurement resource;
when the configuration information indicates that the DCI is used, the transceiver is configured to receive the DCI to trigger the measurement resource; and
the processing circuitry is configured to:
allow the signal quality measurement on at least one symbol corresponding to the semi-persistent CSI-RS resource; and
disallow UL transmission and/or DL reception by the electronic device on the at least one symbol corresponding to the semi-persistent CSI-RS resource.

19. The electronic device according to claim 16, wherein
the at least one of the measurement resource and the reporting includes the measurement resource and the reporting;

the reporting is aperiodic, the measurement resource is the aperiodic CSI-RS resource, and the configuration information further indicates DCI is used to trigger the scheduling restriction;

the transceiver is configured to receive the DCI to trigger the measurement resource and the reporting; and the processing circuitry is configured to:

allow the signal quality measurement on at least one symbol corresponding to the aperiodic CSI-RS resource; and disallow UL transmission and/or DL reception by the electronic device on the at least one symbol corresponding to the aperiodic CSI-RS resource.

20. The electronic device according to claim 11, wherein the processing circuitry is configured to:

determine that no scheduling restriction is applied to the measurement resource when the measurement resource satisfies a condition, the condition including that (i) the measurement resource is a CSI-RS, (ii) the CSI-RS is quasi co-located with an active transmission configuration indicator (TCI) state for physical downlink shared channel (PDSCH)/physical downlink control channel (PDCCH), (iii) the CSI-RS is not in a CSI-RS resource set with a higher layer parameter 'repetition' being ON, and (iv) the CSI-RS is in a CSI-RS resource set with the higher layer parameter 'repetition' set to OFF; and determine that the scheduling restriction is applicable to the measurement resource when the measurement resource does not satisfy the condition.

* * * * *